(12) United States Patent
Carlson et al.

(10) Patent No.: US 6,475,340 B1
(45) Date of Patent: Nov. 5, 2002

(54) SOLID PHASE EXTRACTION MEMBRANE

(75) Inventors: Kurt C. Carlson, Nashville, TN (US); Roger L. Langer, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/269,138

(22) PCT Filed: Sep. 20, 1996

(86) PCT No.: PCT/US96/15183

§ 371 (c)(1),
(2), (4) Date: Mar. 15, 1999

(87) PCT Pub. No.: WO98/12385

PCT Pub. Date: Mar. 26, 1998

Related U.S. Application Data

(63) Continuation-in-part of application No. 08/408,220, filed on Mar. 22, 1995, now abandoned.

(51) Int. Cl.[7] ............... D21H 27/08; D21H 13/26; D21H 13/14; B01D 39/08; B01J 20/28
(52) U.S. Cl. ............... 162/157.3; 162/146; 162/169; 162/157.1; 162/181.2; 162/181.6; 162/181.9; 210/493.1; 210/502.1; 210/503; 210/505; 261/100
(58) Field of Search ............... 162/146, 157.1, 162/157.2–157.5, 164.1, 169, 175, 141, 188, 181.1–181.8; 210/502.1, 504, 505, 508, 509, 503.5, 36, 493.1, 638, 635, 198.2; 55/524–528; 261/100

(56) References Cited

U.S. PATENT DOCUMENTS

| | | | |
|---|---|---|---|
| 4,200,679 A | 4/1980 | Klein | 428/402 |
| 4,207,378 A | 6/1980 | Klein | 428/402 |
| 4,239,516 A | 12/1980 | Klein | 55/389 |
| 4,286,977 A | 9/1981 | Klein | 55/524 |
| 4,293,378 A | 10/1981 | Klein | 162/145 |
| 4,344,775 A | 8/1982 | Klein | 55/75 |
| 4,384,957 A | 5/1983 | Crowder, III et al. | 210/656 |
| 4,395,332 A | 7/1983 | Klein | 210/496 |
| 4,431,542 A | 2/1984 | Dingfors et al. | 210/502.1 |
| 4,454,044 A | 6/1984 | Klein | 210/663 |
| 4,488,969 A * | 12/1984 | Hou | 210/679 |
| 4,512,897 A | 4/1985 | Crowder, III et al. | 210/656 |
| 4,524,103 A | 6/1985 | Seager | 428/338 |
| 4,548,678 A | 10/1985 | Laflin et al. | 162/146 |
| 4,596,839 A * | 6/1986 | Peters | 523/175 |
| 4,664,812 A | 5/1987 | Klein | 210/679 |
| 4,729,921 A | 3/1988 | Tokarsky | 428/288 |
| 4,906,378 A * | 3/1990 | Hagen et al. | 210/635 |
| 4,943,375 A | 7/1990 | Bradshaw et al. | 210/674 |
| 4,952,321 A | 8/1990 | Bradshaw et al. | 210/670 |
| 4,959,153 A | 9/1990 | Bradshaw et al. | 210/670 |
| 4,975,379 A | 12/1990 | Bradshaw et al. | 436/77 |
| 4,996,277 A | 2/1991 | Bradshaw et al. | 528/15 |
| 5,026,456 A | 6/1991 | Hesler et al. | 162/146 |
| 5,039,419 A | 8/1991 | Bradshaw et al. | 210/502.1 |
| 5,071,819 A | 12/1991 | Tarbet et al. | 502/401 |
| 5,078,978 A | 1/1992 | Tarbet et al. | 423/22 |
| 5,084,430 A | 1/1992 | Tarbet et al. | 502/401 |
| 5,120,443 A | 6/1992 | Bruening et al. | 210/638 |
| 5,173,470 A | 12/1992 | Bruening et al. | 502/401 |
| 5,175,110 A | 12/1992 | Bradshaw et al. | 436/77 |
| 5,179,213 A | 1/1993 | Bradshaw et al. | 549/3 |
| 5,182,251 A | 1/1993 | Bruening et al. | 502/401 |
| 5,190,661 A | 3/1993 | Bruening et al. | 210/670 |
| 5,244,856 A | 9/1993 | Bruening et al. | 502/158 |
| 5,273,660 A | 12/1993 | Bruening et al. | 210/670 |
| 5,279,742 A * | 1/1994 | Markell et al. | 210/638 |
| 5,300,192 A | 4/1994 | Hansen et al. | 162/184 |
| 5,316,679 A | 5/1994 | Bruening | 210/634 |
| 5,334,316 A | 8/1994 | Bruening et al. | 210/670 |
| 5,352,480 A | 10/1994 | Hansen et al. | 427/202 |
| 5,393,892 A | 2/1995 | Krakowiak et al. | 549/214 |
| 5,403,489 A * | 4/1995 | Hagen et al. | 210/638 |
| 5,415,779 A * | 5/1995 | Markell et al. | 210/635 |
| 5,498,478 A | 3/1996 | Hansen et al. | 428/372 |
| 5,529,844 A | 6/1996 | Degen et al. | 428/357 |
| 5,538,634 A * | 7/1996 | Pfiffner et al. | 210/500.26 |
| 5,585,070 A * | 12/1996 | Lessard et al. | 422/101 |
| 5,637,506 A * | 6/1997 | Goken et al. | 436/57 |
| 5,688,370 A * | 11/1997 | Hagen et al. | 162/146 |
| 5,897,779 A * | 4/1999 | Wisted et al. | 210/651 |
| 5,911,883 A * | 6/1999 | Anderson | 210/679 |
| RE36,811 E * | 8/2000 | Markell et al. | 210/638 |
| 6,106,721 A * | 8/2000 | Bouvier et al. | 210/635 |

FOREIGN PATENT DOCUMENTS

| | | |
|---|---|---|
| EP | 0 130 418 A3 | 6/1984 |
| EP | 0 432 438 A1 | 11/1990 |
| EP | 0 498 557 A1 | 1/1992 |
| EP | 0 662 340 A1 | 1/1995 |
| WO | WO 93/06924 | 4/1993 |
| WO | WO 94/11556 | 5/1994 |
| WO | WO 95/17247 | 6/1995 |
| WO | WO 96/29146 | 9/1996 |

\* cited by examiner

*Primary Examiner*—Jose Fortuna
(74) *Attorney, Agent, or Firm*—Gary L. Griswold; Robert W. Sprague; William J. Bond

(57) ABSTRACT

A wet-laid, porous solid phase extraction sheet material that contains both active particles and binder and that possesses excellent wet strength is described. The binder is present in a relatively small amount while the particles are present in a relatively large amount. The sheet material is sufficiently strong and flexible so as to be pleatable so that, for example, it can be used in a cartridge device.

20 Claims, 1 Drawing Sheet

SOLID PHASE EXTRACTION MEMBRANE

This application is a national stage application of PCT/US96/15183, filed Sep. 20, 1996, which is a continuation-in-part of U.S. application Ser. No. 08/408,220, filed Mar. 22, 1995 now abandoned.

The invention was made with Government support under Subcontract 203690-A-F1, with Battelle Memorial Institute, Pacific Northwest Laboratories, based on a Contract DE-AC06-76RLO-1830 awarded by the United States Department of Energy. The United States Government has certain rights in the invention.

BACKGROUND OF THE INVENTION

1. Field of the Invention

This invention relates to a solid phase extraction sheet material that includes a porous matrix prepared by a wet-laid method, active particulate entrapped therein, and a polymeric hydrocarbon binder.

2. Background Information

Fibrous pulps can be converted to sheet materials by classic paper making methods generally known in the art as "wet-laid" or "handsheet" methods. In addition to the preparation of paper from a cellulose pulp, the preparation of sheet materials useful as substrates for physical filtration processes and paper chromatography is also known.

Addition of particles to such fibrous pulps is also known. In U.S. Pat. Nos. 5,300,192 and 5,352,480, wet-laid sheet materials that contain organic or inorganic particles capable of binding to an added binder compound (through covalent or hydrogen bonding) are described.

Synthetic papers prepared from poly(m- or p-phenylene iso- or terephthalamide) fibers, widely known as aramid fibers, are known. Such aramid papers are commonly processes into dense, non-porous, stiff substrates such as substrates for circuit boards. See, e.g., U.S. Pat. No. 4,729,921.

Aramid papers that include fillers have been described in, for example, U.S. Pat. No. 4,548,678. Fillers are often used to alter the physical properties or performance of the aramid paper. Commonly, filler-containing papers also are dense and non-porous.

A high porosity aramid paper that includes pulp from both fresh and previously dried (i.e., used or recycled) fibers but that does not contain particles or binder is described in U.S. Pat. No. 5,026,456. Other porous aramid papers that do not contain particles or binder, but which are useful in physical filtration processes, are described in U.S. Pat. Nos. 4,524,103 and 5,529,844.

A wet-laid aramid sheet material that contains reactive or sorptive particles is described in PCT Patent Document WO 95/17247. This sheet material is prepared in the absence of any binder and, accordingly, exhibits limited physical strength and tends to shrink when wet.

Crowder, III et al. (U.S. Pat. No. 4,384,957) describe a chromatography column in which a series of fiber-particle matrices are configured in a stacked arrangement. Suitable fibers are said to include polyacrylonitrile, rayon, cellulose, etc., and useful particles are said to be those that "exhibit chromatographic functionality" (e.g. silica, alumina, activated carbon, ion exchange resins, etc.). In passing (col. 10, lines 58–61), the use of "chemical binders" is provided for, although none of the examples teach the use of a binder and no type of useful binder is mentioned in the document.

Not yet described in the art is a wet-laid type sheet material that contains reactive or sorptive particles and that possesses high wet strength, good tensile strength, and pleatability.

SUMMARY OF THE INVENTION

Briefly, the present invention provides a solid phase extraction sheet (i.e., a sheet that can remove one or more chemical species that are dissolved or entrained in a fluid) that includes a porous polymeric pulp comprising fibers, at least 75% of which are at least 4 mm long; from about 3 to about 7 weight percent of a polymeric hydrocarbon binder; and particles entrapped in the fiber pulp. A plurality of the particles exhibit reactive and/or sorptive properties toward the chemical species to be removed, and the weight ratio of particles to binder is at least 13:1. The sheet has a thickness of up to about 5 mm, a basis weight of from about 600 to about 2000 g/m$^2$, and an apparent density of at least about 0.35 g/cm$^3$.

Solid phase extraction (SPE) sheets can be used in place of particle-packed columns to remove solutes from fluids. Accordingly, the inclusion of large amounts of active (i.e., sorptive or chemically reactive) particles in such sheets is desirable. In the SPE sheet of the present invention, particles are present in such an amount that the weight ratio of particles to binder is at least 13:1, preferably at least 14:1, and more preferably at least 15:1. Preferably, a plurality of the particles are active particles. A preferred amount of binder is about 5% (by weight). When this amount of binder is used, the amount of particles is about 65% (by wt.), preferably about 70% (by wt.), and more preferably about 75% (by wt.).

The average uncalendered thickness of the sheet can be up to about 5 mm so as to keep extraction efficiency as high as possible. Nevertheless, if very small particles are used, the pressure drop across the SPE sheet can become unreasonably high, so the sheet preferably has an average uncalendered sheet thickness is at least 125 times larger, more preferably at least 175 times larger, most preferably 200 times larger, than the effective average particle diameter. Also, to ensure that the sheet can be pleated by commercially available pleaters such that the edges of the folded sheet do not substantially crack (so as to permit channeling or leaking), the basis weight of the sheet preferably is about 600 to about 2000 g/m$^2$ and the apparent density preferably is at least about 0.35 g/cm$^3$, more preferably at least about 0.4 g/cm$^3$.

The SPE sheet of the present invention can be used in severe conditions where currently available SPE sheets, e.g., fibrillated polytetrafluoroethylene (PTFE) sheets, tend to degrade. An example of such severe conditions is in the highly caustic (i.e., pH of about 14), radioactive isotope-laden waste from some nuclear facilities. The radiation emitted by the radioactive isotopes of such waste (e.g., Cs$^+$ and Sr$^{+2}$) degrades PTFE SPE sheets.

Unless a contrary intent is evident, the following definitions apply herein:

(a) "active" means possessing ion exchange, reactive, or sorptive properties;

(b) "apparent density" means the weight of a given SPE sheet divided by its average volume (which can be calculated by measuring the average thickness of a sample of a sheet of known length and width); and (c) "hydrocarbon" (when used in conjunction with binders) means an organic material that may contain heteroatoms (e.g., O, S, N, F, etc.) but derives at least 50% of its weight from hydrogen and carbon.

DETAILED DESCRIPTION OF PREFERRED EMBODIMENTS

Figure 1:
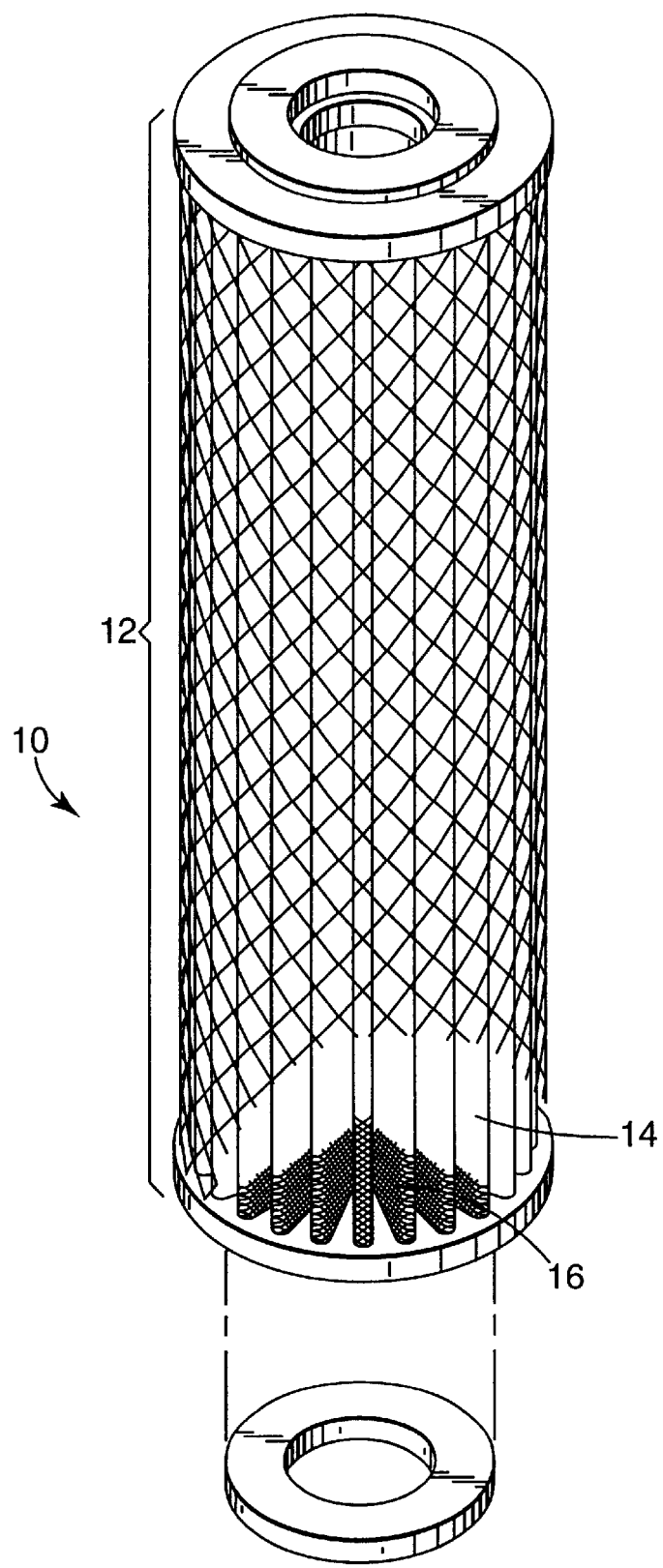
FIG. 1 shows a cartridge device comprising a pleated sheet of the invention.

The SPE sheet of the present invention includes polymeric pulp, binder, and particles. The use of binder allows for the manufacture of SPE sheets with good wet strength and at least some resistance to shrinkage.

Generally, the fibers that make up the porous polymeric pulp of the SPE sheet of the present invention can be any pulpable fiber (i.e., any fiber that can be made into a porous pulp). Preferred fibers are those that are stable to radiation and/or to a variety of pHs, especially very high pHs (e.g., pH=14) and very low pHs (e.g., pH=1). Examples include polyamide fibers and those polyolefin fibers that can be formed into a pulp including, but not limited to, polyethylene and polypropylene. Particularly preferred fibers are aromatic polyamide and aramid fibers because of their stability to both radiation and highly caustic fluids. Examples of useful aromatic polyamide fibers are those fibers of the nylon family. Examples of useful aramid fibers are those fibers sold under the trade name Kevlar™ (DuPont; Wilmington, Del.). Pulps of such fibers are commercially available in various grades based on the length of the fibers that make up the pulp such as, for example, Kevlar™ 1F306 or 1F694, both of which include aramid fibers that are at least 4 mm in length. Regardless of the type of fiber(s) chosen to make up the pulp, the relative amount of fiber in the resulting SPE sheet (when dried) preferably ranges from about 12.5% to about 30% (by wt.), more preferably from about 15% to 25% (by wt.).

Where at least about 75%, preferably at least about 85%, more preferably at least about 95%, and most preferably at least about 99% of the fibers of the polymeric pulp have a length of at least about 4 mm, an uncalendered SPE sheet can be pleated so as to allow for inclusion in cartridge devices known in the art. To pleat the SPE sheet, it can be placed between two screens, scrims, or a screen and a scrim, and pleated by a variety of well known methods using one of a variety of commercially available pleating machines. The screens and/or scrims help to cushion the sheet during pleating by reducing the amount of stress applied to the sheet by the pleating blades. The pleating can be traditional (in other words, parallel to the length of the cartridge device) or horizontal (in other words, perpendicular to the length of the cartridge device), as is described in U.S. Pat. No. 4,842,739.

Typical of blade pleaters that are commercially available are those made by Robafsky GmbH (Berlin, Federal Republic of Germany). Such pleaters use blades that move up and down (as well as laterally, to some extent) when driven by gears and a cam action device. The pleat height is set by the distance that the blades are permitted to move vertically. As the sheet to be pleated becomes thicker, the clearances between the blades and pleat height stops become smaller and smaller. If these clearances become too small, the sheet becomes pinched between the stops and the blades, which causes cracks on the pleat tips. Practically, SPE sheets of the present invention can have a thickness of about 0.20 inch (i.e., about 5.1 mm) and still be pleated without significant amounts visible cracking.

Incorporating a pleated SPE, sheet of the present invention into a cartridge device allows for ease of handling during use and ease of disposal after use. The screens and/or scrims used during the pleating process can be removed prior to incorporating the sheet into such a cartridge device. FIG. 1 shows a cartridge device 10 having housing 12 and pleated solid phase extraction sheet 14 of the invention. Optionally, sheet 14 can be placed between screens or scrims 16 during the pleating process. Screens or scrims 16 can be removed prior to incorporating sheet 14 into cartridge device 10. A good description of cartridge sorption devices, including how to make and use the same, can be found in EP-A-662 340 and U.S. patent application Ser. No. 08/590,978, the disclosures of which are incorporated herein by reference.

Useful binders in the SPE sheet of the present invention are those materials that are stable over a range of pHs (especially high pHs) and that exhibit little or no interaction (i.e., chemical reaction) with either the fibers of the pulp or the particles entrapped therein. Polymeric hydrocarbon materials, originally in the form of latexes, have been found to be especially useful. Common examples of useful binders include, but are not limited to, natural rubbers, neoprene, styrene-butadiene copolymer, acrylate resins, and polyvinyl acetate. Especially where the SPE sheet is to be used under severe circumstances (e.g., with very caustic liquids and/or in the presence of radioactive materials), the use of natural rubber, neoprene, and/or styrene-butadiene copolymer is preferred. Particularly preferred binders include neoprene and styrene-butadiene copolymer. Regardless of the type of binder used, the relative amount of binder in the resulting SPE sheet (when dried) is about 3% to about 7% (by wt.), preferably from about 5% to about 7% (by wt.). The preferred amount has been found to provide sheets with nearly the same physical integrity as sheets that include higher loadings of binder while allowing for as great a particle loading as possible.

Active particles that can be incorporated in the SPE sheet of the present invention include those that, by ion exchange, chelation, covalent bond formation, size exclusion, or sorption mechanisms, bind and remove molecules and/or ions from fluids in which they are dissolved or entrained. Particles that undergo chemical reactions including oxidation and/or reduction are a particularly useful class. Representative examples include silico titanates such as Ionsiv™ crystalline silico titanate (UOP; Tarrytown, N.Y.), sodium titanate (Allied Signal Corp.; Chicago, Ill.), potassium cobalt hexacyanoferrate, anion sorbers such as Anex™ organic anion sorber (Serasep Corp.; Santa Clara, Calif.), cation sorbers such as Diphonix™ organic cation sorber (Eichrome Industries; Chicago, Ill.) inorganic oxides such as silica, alumina, and zirconia, and derivatives thereof. Useful derivatives include polymeric coatings and organic moieties (such as $C_{18}$ alkyl chains, chelating ligands, and macrocyclic ligands) that are covalently bonded to the inorganic oxide particle. For an overview of such derivatized particles, see, e.g., U.S. Pat. Nos. 5,393,892, 5,334,326, 5,316,679, 5,273,660, 5,244,856, 5,190,661, 5,182,251, 5,179,213, 5,175,110, 5,173,470, 5,120,443, 5,084,430, 5,078,978, 5,071,819, 5,039,419, 4,996,277, 4,975,379, 4,959,153, 4,952,321, and 4,943,375, the disclosures of which are incorporated herein by reference.

Other useful active particles include polymeric organic resins, such as styrene divinylbenzene and derivatives thereof The particles can have ion exchange, chelation, or chiral separation properties. Hydrophobic zeolites such as those sold under the trade name Silicalite™ (UOP) are particularly useful in an aramid fiber sheet for isolating volatile organic compounds since both components are stable at high temperatures. Carbon (in either activated or unactivated form) can be useful as a sorptive particulate in certain applications. Hydrophobic molecular sieves can be useful to sorb organic materials such as pollutants. Alumina coated with elemental gold is a useful reactive particulate in certain oxidation-reduction reactions, and to isolate elemental mercury by amalgam formation.

Inactive particles that can be included in the SPE sheet include titanium dioxide, ferric oxide, and the like. The inclusion of inactive particle can sometimes positively affect the pleatability of the sheet by influencing, for example, the basis weight of the sheet.

Preferably, the effective average diameter of particles used in the SPE sheet of the present invention ranges from about 2 to 75 μm, more preferably from about 9 to 18 μm. The effective average diameter of the particles is at least 125 times smaller than the uncalendered thickness of the sheet, preferably at least 175 times smaller than the uncalendered thickness of the sheet, more preferably at least 200 times smaller than the uncalendered thickness of the sheet.

Because the capacity and efficiency of the SPE sheet depends on the amount of active particles included therein, high particle loading is desirable. The relative amount of particles in a given SPE sheet of the present invention is preferably at least about 65% (by wt.), more preferably at least about 70% (by wt.), and most preferably at least about 75% (by wt.). Preferably, a large plurality of these particles are active particles. Additionally, the weight percentage of particles in the resulting SPE sheet is at least 13 times greater than the weight percentage of binder, preferably at least 14 times greater than the weight percentage of binder, more preferably at least 15 times greater than the weight percentage of binder. Weight ratios of particles to binder can range up to about 28:1 where the minimum amount of binder (i.e., 3 weight percent) is used.

Regardless of the type or amount of the particles used in the SPE sheet of the present invention, they are mechanically entrapped or entangled in the polymeric fibers of the porous polymeric pulp. In other words, the particles are not covalently bonded to the fibers.

The SPE sheet of the present invention can also include one or more adjuvants. Useful adjuvants include those substances that act as process aids and those substances that act to enhance the overall performance of the resulting SPE sheet. Examples of the former category include sodium aluminate and aluminum sulfate (commonly known as alum), which help to precipitate binder into the pulp, and dispersants or surfactants such as Tamol™ 850 dispersant (Rohm & Haas Co.; Philadelphia, Pa.). Examples of the latter category include crosslinking agents, such as zinc oxide, for certain binders, such as neoprene. When used, relative amounts of such adjuvants range from more than zero up to about 0.5% (by wt.), although their amounts are preferably kept as low as possible so as not to take away from the amount of particles that can be added.

To make the SPE sheet of the present invention, chopped fibers and a liquid, normally water, are added to a container and blended. The amount of shear used has not been found to affect the ultimate properties of the resulting SPE sheet, although the amount of shear introduced during blending is preferably high. Thereafter, particles, binder (in the form of a latex) and an excess of a pH adjusting agent such as alum, which acts to precipitate the binder, are added to the container. If an SPE sheet is to be made by hand-sheet methods known in the art, the order that these three ingredients are added does not significantly affect ultimate performance of the SPE sheet. However, addition of binder after addition of particles can result in an SPE sheet where binder is more likely to adhere the particles to the fibers of the SPE sheet. Also, if an SPE sheet is to be made by a continuous method, the three ingredients must be added in the listed order. (The remainder of this discussion is based on the hand-sheet method, although those skilled in the art can readily recognize how to adapt that method to allow for a continuous process.)

After the particles, binder, and pH adjusting agent are added to the fiber-liquid slurry, the overall mixture is poured into a mold, the bottom of which is covered by a screen. Water is allowed to drain from the wet sheet through the screen. After sufficient water has drained from the sheet, the wet sheet normally is removed from the mold and dried by pressing, heating, or a combination of the two. Normally, pressures of 300 to 600 kPa and temperatures of 400 to 200° C., preferably 100° to 150° C., are used in these drying processes.

Once made, the SPE sheet of the present invention can be cut to the desired size and used as is. If desired (e.g., where a significant pressure drop across the sheet is not a concern), the SPE sheet can be calendered so as to increase the tensile strength thereof. (Where the SPE sheet is to be pleated, drying and calendering preferably are avoided.)

Those skilled in the art of SPE are aware that SPE sheets need to have sufficient tensile strengths to withstand the sometimes significant pressure drops involved. Accordingly, the sheet of the present invention preferably has a tensile strength of at least about $2 \times 10^5$ Pa (about 30 psi), more preferably of at least about $6.9 \times 10^5$ Pa (about 100 psi).

For an SPE sheet can be pleated successfully, it must exhibit a certain combination of characteristics. Specifically, the average apparent density and the basis weight of the SPE sheet both play important roles. Although some fiber-particle combinations can be used to make SPE sheets with average apparent densities of about 0.35–0.37 g/cm$^3$ that can be pleated, an apparent density of at least about 0.4 g/cm$^3$ is preferred. As a general rule, SPE sheets of the present invention with apparent densities much less than about 0.4 g/cm$^3$ tend to be less pleatable (i.e., when pleated, the pleat tips tend to crack unacceptably).

Additionally, the SPE sheet of the present invention has a basis weight of between about 600 and about 2000 g/m$^2$. Below about 600 g/m$^2$, efficacy of the SPE sheet is limited due to the increased probability of channeling, and, above about 2000 g/m$^2$, efficacy of the SPE sheet is reduced due to increased pressure drops and its pleatability is reduced. (As discussed above with respect to apparent density, some fiber-particle combinations can result in aberrant sheets. In other words, although a given combination might result in a sheet having a basis weight slightly less than 2000 g/m$^2$, that sheet might not be able to be pleated successfully. Nevertheless, the range of about 600 to about 2000 g/m$^2$ for acceptable basis weights generally holds true.)

Regardless of form, the SPE sheet of the present invention can be used to remove solutes from fluids that pass through the SPE sheet. Preferably, the SPE sheet of the present invention can be used to remove radioactive isotopes from nuclear energy waste. Such waste can be highly acidic (e.g., pH=1) or highly caustic (e.g., pH=14) and radioactive. An example of a preferred SPE sheet for use in a radioactive environment includes a combination of fibers derived from an aramid pulp, styrene-butadiene binder, and particles that selectively remove the solute(s) of interest. (Those skilled in the art recognize which of the aforementioned particles, and substantial equivalents thereof, are specific for one or more given radioactive ions.) Preferred amounts of binder and particles in such a sheet are in the ranges of from about 5 to about 7 weight percent and from about 70 to about 80 weight percent, respectively.

Objects and advantages of this invention are further illustrated by the following examples. The particular materials and amounts thereof, as well as other conditions and details, recited in these examples should not be used to unduly limit this invention.

EXAMPLES

Example 1

To an agitated slurry of 6 g Kevlar™ 6F543 dry aramid fiber pulp (DuPont) and 2000 mL water in a 4 liter blender was added 1.9 g of a 33% aqueous solution of sodium aluminate. After blending at a low speed setting for 30 seconds, 5 g (2 g dry weight) styrene-butadiene latex binder slurry (B. F. Goodrich Co.; Cleveland, Ohio) was added. Blending was continued for 15 seconds at a low speed before 12 g alum was added, with blending. At that point, binder precipitated onto the pulp. While blending of the slurry was continued, 32 g silica with an average diameter of 9 $\mu$m (Davison Chemicals Co.; Baltimore, Md.) in 500 mL water was added.

The mixture was poured into a sheet mold (Williams Apparatus Co.; Watertown, N.Y.) with a 930.3 cm$^2$ porous screen having pores of approximately 0.14 mm (i.e., 100 mesh) at the bottom to allow the water to drain. This gave a wet sheet, which was pressed in a pneumatic press (Mead Fluid Dynamics; Chicago, Ill.) at 482 kPa for about five minutes to remove additional water. The sheet was dried on a hot plate at 104° C. for 60 minutes, then at 129° C. for another 10 minutes to give a dry sheet. The sheet had the following characteristics:

| | |
|---|---|
| average thickness | 2.8 mm |
| apparent density | 0.33 g/cm$^3$ |
| wt. % of particles in SPE sheet | 73% |
| basis weight | 936 g/m$^2$ |
| tensile strength | 692 kPa. |

(Density values throughout the Examples were calculated by dividing the listed basis weight by the listed average thickness.)

Tensile strength and elongation were measured according to ASTM method D882-91.

Example 2

To an agitated slurry of 10 g Kevlar™ 1F306 dried aramid fiber pulp (DuPont) and 2500 mL water in a 4 liter blender was added 1.9 g of a 33% aqueous solution of sodium aluminate. After blending at a low speed setting for 30 seconds, 6.25 g (2.5 g dry weight) styrene-butadiene latex binder slurry was added. Blending was continued for 15 seconds at a low speed. To this mixture was added a slurry of 37.5 g silica particles (Davison Chemical) that had been previously coated with approximately 2 to 5 weight percent, based on the weight of the silica particles, SuperLig™ 304 extractant (IBC Advanced Technologies, Inc.; Provo, Utah) dispersed in 300 mL water. After 15 seconds of blending, 18 g alum was added with blending, and the binder precipitated onto the pulp and particulate.

A solid sheet was prepared from the slurry as described in Example 1. The wet sheet was pressed for 5 minutes at 413 kPa, then dried at 149° C. for 30 minutes to give a dry sheet having the following characteristics:

| | |
|---|---|
| average thickness | 2.8 mm |
| apparent density | 0.38 g/cm$^3$ |
| wt. % particles in SPE sheet | 74% |
| basis weight | 1061 g/m$^2$ |
| tensile strength | 1.98 MPa. |

Example 3

To an agitated slurry of 10 g Kevlar™ 1F306 dried aramid fiber pulp and 2500 mL water in a blender was added 1 g Tamol™ 850 dispersant. After blending at a low speed setting for 30 seconds, 113.3 g of a 33% (by wt.) aqueous slurry of particles of SuperLig™ 644 with an average particle size of 9.5 $\mu$m (IBC Advanced Technologies) was added with continued blending. Next, 6.25 g (2.5 g dry weight) styrene-butadiene latex binder slurry was added and blending was continued for 15 seconds at a low speed. To this mixture was added a solution of 12 g alum in 25 mL water, and blending was continued as the binder precipitated onto the pulp and particulate.

A handsheet was prepared from the mixture and pressed for 5 minutes at 620 kPa, then heated on a hot plate at 110° C. for 45 minutes. The resultant dry sheet had the following characteristics:

| | |
|---|---|
| average thickness | 2.4 mm |
| apparent density | 0.44 g/cm$^3$ |
| wt. % particles in SPE sheet | 69% |
| basis weight | 1060 g/m$^2$ |
| tensile strength | 2.4 MPa. |

Samples of the dried sheet were then exposed to acidic, basic, and neutral solutions and tested for residual strength. In each case, a sample of the sheet was soaked in the solution indicated for the amount of time shown, then removed and retested wet. The results are shown in Table 1.

TABLE 1

| Sample | Tensile Strength (MPa) | % change from dry |
|---|---|---|
| Dry | 2.4 | — |
| Water[1] | 2.8 | +16 |
| Acid[2] | 2.3 | −4 |
| Base[3] | 1.3 | −45 |

[1] 21 days in deionized water.
[2] 2 days in 1M aqueous HNO$_3$.
[3] 21 days in 4M aqueous NaOH.

A comparative sample (i.e., an SPE sheet made identically with the exception that no binder was added) was also made. This comparative sample had a (dry) tensile strength of 0.2 MPa. Its wet tensile strength could not be measured because it returned to a pulp when wetted.

Example 4

To an agitated slurry of 6 g Kevlar™ 6F543 dry aramid fiber pulp and 2000 mL water in a blender was added 1.9 g of a 33% aqueous solution of sodium aluminate. After blending at a low speed setting for 30 seconds, 4.36 g (1.75 g dry weight) styrene-butadiene latex binder slurry was added and blending was continued for 15 seconds at a low speed. To this mixture was added 12 g alum with blending, and the binder precipitated onto the pulp. Finally, 26.25 g zirconia particles having an average diameter of 11 $\mu$m (prepared as described in Example No. 5 of U.S. Pat. No. 5,015,373) in 500 mL water was added with continued blending.

A sheet was prepared as described in Example 1. The sheet was pressed for 5 minutes under 413 kPa pressure, then heated for 30 minutes at 149° C. and 10 minutes at 129° C. on a hot plate. The resulting sheet had the following characteristics:

| | |
|---|---|
| average thickness | 1.1 mm |
| apparent density | 0.81 g/cm³ |
| wt. % particles in SPE sheet | 73% |
| basis weight | 895 g/m² |
| tensile strength | 5.9 MPa. |

After 48 hours immersion in a 1 M $HNO_3$, the sheet exhibited a tensile strength of 2.8 MPa. This example demonstrates the excellent retention of strength shown by the SPE sheet of the present invention when a binder is used in its preparation.

Example 5

To an agitated slurry of 10 g Kevlar™ 1F306 dried aramid fiber pulp and 2000 mL water in a blender was added 1.9 g of a 33% aqueous solution of sodium aluminate. After blending at a low speed setting for 30 seconds, 8.37 g (3.35 g dry weight) styrene-butadiene latex binder slurry was added and blending was continued for 15 seconds at a low speed. To this mixture was added 18 g alum was added with blending, and the binder precipitated onto the pulp. Thereafter, a mixture of 53.6 g zirconia particles having an average diameter of 11 μm (prepared as described in Example 4) in 500 mL water containing 1% (by wt.) potassium tripolyphosphate was added with continued blending.

A sheet was prepared as described in Example 1. The sheet was pressed for 5 minutes under 551 kPa pressure, then heated for 60 minutes at 104° C. and 10 minutes at 129° C. on a hot plate. The resulting sheet had the following characteristics:

| | |
|---|---|
| average thickness | 1.65 mm |
| apparent density | 1.0 g/cm³ |
| wt. % particles in SPE sheet | 78% |
| basis weight | 1632 g/m² |
| tensile strength | 6.1 MPa. |

After 18 days immersion in a 4 M NaOH, the sheet exhibited a tensile strength of 2.3 MPa. This example demonstrates the excellent retention of strength shown by the SPE sheet material of the present invention when a binder is used in its preparation.

Example 6

To an agitated slurry of 6 g Kevlar™ 1F306 dried aramid fiber pulp and 2500 mL water in a blender was added 1.9 g of a 33% aqueous solution of sodium aluminate. After blending at a low speed setting for 30 seconds, 4.36 g (1.75 g dry weight) styrene-butadiene latex binder slurry was added and blending was continued for 15 seconds at a low speed. To this mixture was added 12 g alum with blending, and the binder precipitated onto the pulp. The slurry was diluted with 200 mL isopropyl alcohol before 5 drops (approximately 0.5 mL) of a defoamer (Henkel Corp.; Ambler, Pa.) was added. Finally, 28 g zirconia particles having an average diameter of 11 μm (prepared as in Example 4) and further coated with approximately 2 to 5 weight percent, based on the weight of the zirconia particles, SuperLig™ 625 extractant (IBC Advanced Technologies) in 500 mL of a 90:10 solution of water-isopropanol containing 0.5 mL defoamer was added with continued blending.

A sheet was prepared as described in Example 1. The sheet was pressed for 5 minutes under 551 kPa pressure, then heated for 30 minutes at 109° C. and 10 minutes at 149° C. on a hot plate. The resulting sheet had the following characteristics:

| | |
|---|---|
| average thickness | 1.26 mm |
| apparent density | 0.80 g/cm³ |
| wt. % particles in SPE sheet | 69% |
| basis weight | 1012 g/m². |

Example 7

An agitated slurry of 9.9 g Kevlar™ 6F543 dry aramid fiber pulp and 3500 mL water in a blender was added 1.9 g of a 33% aqueous solution of sodium aluminate was stirred for 30 seconds. To this mixture was added 7.34 g (3.3 g dry weight) of a 45 weight percent aqueous styrene-butadiene latex binder slurry (DuPont), and the mixture was stirred for 15 seconds at a low speed. To this mixture was added, with blending, 0.16 g zinc, then 0.16 g zinc oxide powder (Zinc Corp. of America; Monaca, Pa.). After 15 seconds of blending, 6 g alum was added with blending, and the binder precipitated onto the pulp. A slurry of 52.8 g silica particles that had been previously bonded with approximately 2 to 5 weight percent, based on the weight of the silica particles, SuperLig™ 304 extractant dispersed in 300 mL water was then added and blending was continued for 30 seconds.

A solid sheet was prepared from the slurry as described in Example 1. The wet sheet was pressed for 5 minutes at 448 kPa, then dried at 104° C. for 60 minutes to give a dry sheet.

Example 8

A circular disk having a diameter of about 90 mm was die cut from the sheet prepared in Example 7. This disk was placed in a stainless steel pressure holder (Cole Parmer Instrument Co.; Niles, Ill.) fitted with inlet and outlet pipes and washed with 500 mL deionized water at a flow rate of 55 mL/min. Thereafter, the disk was charged with an aqueous solution of copper sulfate (60 ppm $Cu^{+2}$) at a flow rate of 55 mL/min.

At regular intervals, samples of the effluent stream were taken and analyzed for $Cu^{+2}$. The results are given below in Table 2.

TABLE 2

Extraction of Copper Ions

| Time (min) | [$Cu^{+2}$] (ppm) |
|---|---|
| 2 | 0.6 |
| 4 | 0.5 |
| 6 | 0.3 |
| 8 | 0.5 |
| 10 | 0.6 |
| 15 | 0.3 |
| 20 | 0.5 |
| 25 | 1.0 |
| 30 | 1.0 |
| 35 | 5.4 |
| 40 | 15.8 |
| 45 | 28.9 |
| 50 | 40.4 |
| 55 | 47.9 |
| 60 | 52.2 |

The data of Table 2 show that the first significant appearance of $Cu^{+2}$ in the effluent occurred after approximately 30 minutes and that the sheet was saturated with $Cu^{+2}$ after about 60 minutes. This shows that the capacity of an SPE sheet of the present invention for metal ions in aqueous solutions can be considerable.

Example 9

Two 20.3 cm×20.3 cm squares were cut from the sheet prepared in Example 7. For one week, one of these squares was not dried after being formed while the other was kept in ambient air.

The square kept in air was subjected to treatment in a blade pleater (Robafsky GmbH), but the square split into two pieces at the first pleat.

The sheet that was not allowed to dry was wrapped with a 40×24 strand aramid scrim (DuPont) which weighed approximately 220 g/m². This composite structure was also subjected to treatment in a blade pleater, and it was successfully formed into a pleated structure.

Example 10

To the previously described blender was added 2000 mL of 43° C. tap water and 0.25 g Tamol™ 850 dispersant. To this mixture were added sequentially (followed by 30 second stirrings in the blender) 10.25 g (0.8 g dry) Kevlar™ 1F306 aramid fiber pulp, 25.53 g (24 g dry) Anex™ anion sorbing resin, 6.12 g (6 g dry) zirconia, 5 g Goodrite 1800X73 latex binder (B. F. Goodrich), and 20 g (25% solids) alum. To this mixture was added 4 g of a 1% solution of Nalco™ 7530 flocculent (Nalco Chemical Co.; Naperville, Ill.), and the mixture was agitated in the blender for about 5 seconds.

The slurry from the previous paragraph was poured onto a handsheet mold and drained before being pressed at 550 kPa for about five minutes and then dried at 135° C. for about two hours. The resulting sheet had the following characteristics:

| | |
|---|---|
| average thickness | 2.5 mm |
| apparent density | 0.39 g/cm³ |
| wt. % particles in SPE sheet | 73% |
| basis weight | 1040 g/m². |

Example 11

A series of SPE sheets having the properties set forth in the table below (Table 3) were prepared. In each instance, a hydrocarbon binder was used.

TABLE 3

Comparison of SPE Sheet Properties

| Sample | Particle(s) used | Ratio of Particles | SPE Sheet Characteristics | | | Was the SPE sheet pleatable? |
|---|---|---|---|---|---|---|
| | | | Basis weight (g/m²) | Apparent density (g/cm³) | Tensile strength (Mpa) | |
| A | Diphonix™ cation sorber | N/A | 1730 | 0.50 | 1.7 | Yes |
| B | Diphonix™ cation sorber | N/A | 1722 | 0.50 | 1.7 | No |
| C | Anex™ anion sorber | N/A | (1) | 0.32 | 0.24 | No |
| D | Anex™ anion sorber/ZrO₂ | 4:1 | 1050 | 0.39 | 1.3 | Yes |
| E | Anex™ anion sorber/ZrO₂ | 6:5:1 | 1181 | 0.38 | 0.23 | No |

N/A = not applicable
(1) = includes all basis weights tried

The data of Table 3 show that small changes in the characteristics of the SPE sheet can dramatically affect its pleatability. Specifically, samples A and B show that the pleatability of SPE sheets with identical apparent densities and tensile strengths can be affected by the basis weight of the SPE sheet. Sample A, where the SPE sheet had a basis weight of 1130 g/m², could be pleated, while sample B, where the SPE sheet had a basis weight of 1722 g/m², could not be successfully pleated. (Diphonix™ cation sorber is an example of a particulate that can produce slightly aberrant results, as discussed previously in the Detailed Description section. Specifically, although the sheet in sample B had a basis weight less than 2000 g/m², it could not be successfully pleated. Nevertheless, the 2000 g/m2 upper limit holds as a general rule.)

In samples C, D and E, SPE sheets with Anex™ anion sorber particles are described. In sample C, no additional particles are used. Regardless of basis weight, such an SPE sheet (i.e., one with only Anex™ anion sorber particles) could not be pleated successfully (i.e., without significant cracks at the pleat tips). However, an SPE sheet with a mixture of Anex™ anion sorber particles and zirconia particles having an average apparent density of 0.39 g/cm³ (i.e., sample D) was pleated successfully. A very similar SPE sheet having an average apparent density of 0.38 g/cm³ (i.e., sample E) could not be pleated successfully. This shows the importance of average apparent density on pleatability and that some SPE sheets wtih average apparent densities less than 0.4 g/cm³ can be pleated succesfully.

Various modifications and alterations that do not depart from the scope and spirit of this invention will become apparent to those skilled in the art. This invention is not to be unduly limited to the illustrative embodiments set forth herein.

We claim:

1. A solid phase extraction sheet for removing one or more chemical species dissolved or entrained in a fluid, said sheet comprising a mixture of:
   a) a porous polymeric pulp comprising fibers, said polymeric pulp being selected from the group consisting of aramid, polyethylene, and polypropylene fibers;
   b) from about 3 to about 7 weight percent of a polymeric hydrocarbon binder selected from the group consisting of natural rubber, neoprene, acrylate resins, polyvinyl acetate, and styrene-butadiene copolymer; and
   c) particles entrapped in said pulp, some of said particles exhibiting at least one of reactive and sorptive properties toward said chemical species, said particles being present in an amount such that the weight ratio of particles to binder is at least 13:1, said sheet being produced by a wet-laid processs.

2. The solid phase extraction sheet of claim 1 wherein said particles exhibiting at least one of reactive and sorptive properties are a plurality of said particles entrapped in said fibers.

3. The solid phase extraction sheet of claim 1 wherein said binder is present in an amount of from about 5 to about 7 weight percent.

4. The solid phase extraction sheet of claim 1 wherein said polymeric pulp consists of aramid fibers.

5. The solid phase extraction sheet of claim 1 wherein said particles are sorptive toward said chemical species.

6. The solid phase extraction sheet of claim 1 wherein said at least one of reactive and sorptive particles are selected from the group consisting of carbon, activated carbon, silica, zirconia, silico titanates, sodium titanates, anion sorbers, cation sorbers, and potassium cobalt hexacyanoferrate.

7. The solid phase extraction sheet according to claim 6 wherein said particles further consist of derivatized silica selected from the group consisting of silica particles having at least one of polymeric coatings and organic moieties covalently bonded thereto.

8. The solid phase extraction sheet according to claim 6 wherein said particles further consist of derivatized zirconia selected from the group consisting of zirconia particles having at least one of polymeric coatings and organic moieties covalently bonded thereto.

9. The solid phase extraction sheet of claim 1 wherein said sheet is dried.

10. The solid phase extraction sheet according to claim 1 wherein said fluid is a liquid.

11. The solid phase extraction sheet according to claim 1 wherein said polymeric pulp is selected from the group consisting essentially of aramid fibers.

12. The solid phase extraction sheet according to claim 1 wherein at least 75% of said fibers of said porous polymeric pulp have a length of at least about 4 mm.

13. The solid phase extraction sheet according to claim 1 wherein said sheet has an average uncalendered thickness of up to about 5 mm.

14. The solid phase extraction sheet according to claim 1 wherein said sheet has a basis weight of from about 600 to about 2000 g/m$^2$.

15. The solid phase extraction sheet according to claim 1 wherein said sheet has an apparent density of at least 0.35 g/cm$^3$.

16. The solid phase extraction sheet of claim 1 wherein said sheet is pleated.

17. A cartridge device comprising the pleated sheet of claim 16, said device optionally further comprising one or two screens or scrims in intimate contact with said sheet.

18. A solid phase extraction sheet for removing one or more chemical species dissolved or entrained in a fluid, said sheet comprising a mixture of:
   a) a porous polymeric pulp comprising fibers, said polymeric pulp being selected from the group consisting of aramid, polyethylene, and polypropylene fibers;
   b) from about 3 to about 7 weight percent of a polymeric hydrocarbon binder selected from the group consisting of natural rubber, neoprene, acrylate resins, polyvinyl acetate, and styrene-butadiene copolymer; and
   c) particles entrapped in said pulp, some of said particles exhibiting at least one of reactive and sorptive properties toward said chemical species, said particles being present in an amount such that the weight ratio of particles to binder is at least 13:1;

said sheet being produced by a wet-laid process, and said sheet being sufficiently stable to radiation to permit removal of radioactive isotopes from a fluid.

19. The solid phase extraction sheet according to claim 18 wherein said polymer pulp is selected from the group consisting essentially of aramid fibers.

20. The solid phase extraction sheet according to claim 18 wherein said polymer pulp consists essentially of aramid fibers and said binder is styrene-butadiene copolymer.

* * * * *